United States Patent [19]

Nitta et al.

[11] 4,401,851

[45] Aug. 30, 1983

[54] VOICE RECOGNITION APPARATUS

[75] Inventors: Tsuneo Nitta, Yokohama; Toshitake Murata, Tokyo; Hiroyuki Tsuboi, Yokohama; Takashi Kondo, Kawasaki, all of Japan

[73] Assignee: Tokyo Shibaura Denki Kabushiki Kaisha, Kawasaki, Japan

[21] Appl. No.: 239,647

[22] Filed: Mar. 2, 1981

[30] Foreign Application Priority Data

Jun. 5, 1980 [JP] Japan .................................. 55-75968

[51] Int. Cl.³ .............................................. G10L 1/00
[52] U.S. Cl. .................................................. 179/1 SD
[58] Field of Search ................ 179/1 SD, 1 SB, 1 SC, 179/1 VC; 364/513; 340/146.3 AQ, 146.3 WD

[56] References Cited

U.S. PATENT DOCUMENTS

| | | | |
|---|---|---|---|
| 3,499,987 | 3/1970 | Focht | 179/1 SD |
| 3,553,372 | 1/1971 | Wright | 179/1 SD |
| 3,742,146 | 6/1973 | Newman et al. | 179/1 SD |
| 4,049,913 | 9/1977 | Sakoe | 179/1 SD |
| 4,107,460 | 8/1978 | Grunza et al. | 179/1 SD |

*Primary Examiner*—Emanuel S. Kemeny
*Attorney, Agent, or Firm*—Oblon, Fisher, Spivak, McClelland & Maier

[57] ABSTRACT

A speech recognition circuit in which acoustic power spectrum data corresponding to an input speech signal are sequentially generated, a vowel segment is determined based on the acoustic power spectrum data, and a vowel and a consonant are recognized based on the respective acoustic power spectrum data in the vowel segment and outside the vowel segment. The vowel segment is determined by first detecting a vowel prospective period in which the acoustic power spectrum data exceed a preset value, sequentially calculating the correlation of two successively generated acoustic power spectrum data to detect a stable vowel power spectrum data which provides a maximum correlation, and then calculating the correlation of the stable vowel power spectrum data and each of other acoustic power spectrum data in the vowel prospective period to detect a period in which the correlation is larger than a predetermined value.

13 Claims, 26 Drawing Figures

F I G. 8A 
F I G. 8B 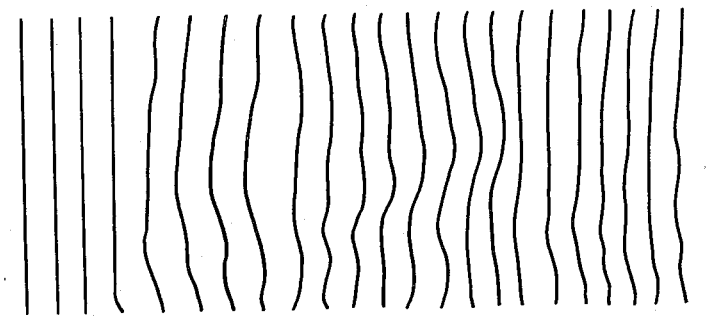
F I G. 8C 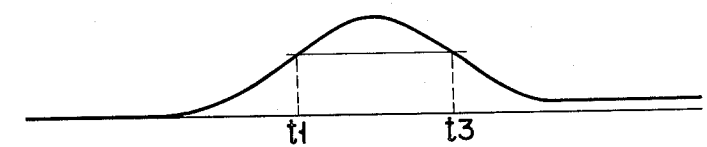
F I G. 8D 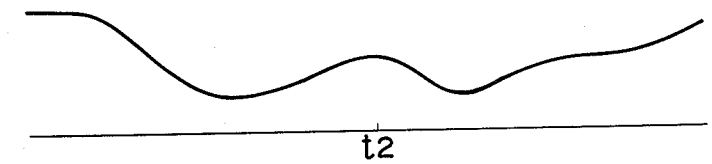
F I G. 8E 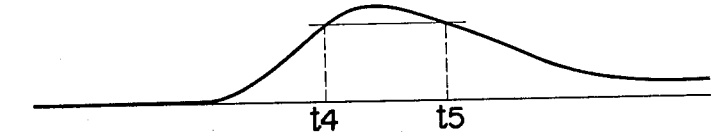

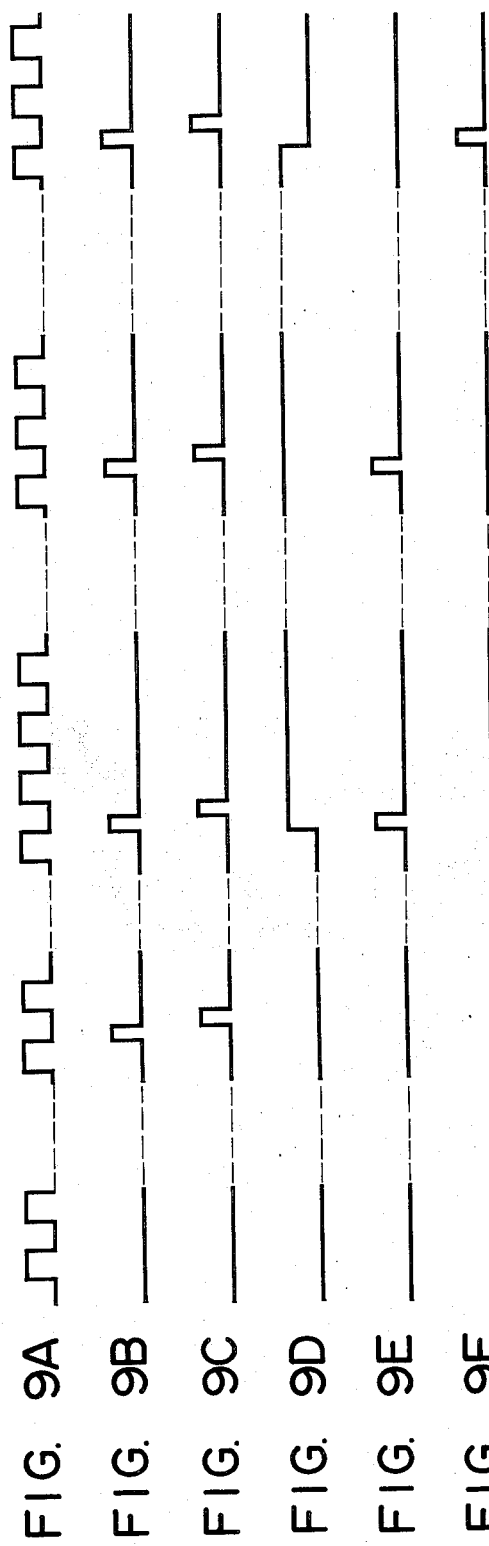

VOICE RECOGNITION APPARATUS

BACKGROUND OF THE INVENTION

The present invention relates to a speech recognition apparatus for recognizing spoken words or speech by dividing the spoken words into phonemes and recognizing the respective detected phonemes.

A keyboard has conventionally been used for inputting instructions and so on in a computer. However, this type of keyboard for inputting data is difficult to handle and requires special training for a operator. Accordingly, a data input method has been recently proposed according to which the instructions are verbally given the spoken words or speech recognized, and the instruction data corresponding to the recognized speech are entered into a computer. When the instruction data is entered using a speech recognition apparatus, the work load on the operator is vastly decreased.

In a speech recognition apparatus of this type, the speech signal is once converted into phonemes and thereafter matched with phonemes prepared in units of words or clauses. The phoneme division, in this case, is performed by separating a series of vowel and consonant phonemes or a series of vowel and vowel phonemes. For this reason, the spoken words has been conventionally divided into phonemes utilizing the fact that the acoustic power of a vowel is larger than that of a consonant, and that the acoustic power of different vowels is also different from each other. Another method for dividing speech into phonemes is based on differences between the acoustic patterns of vowels and consonants, or between vowels, for example, differences in the power spectrum, the zero-crossing interval, the linear predictive coefficient, and the vocal tract area function.

However, both of these methods have been unable to provide precise phoneme division because, in practice, the differences in the speech parameters at two continuous timings are detected, and the speech is divided into phonemes only based on these differences.

SUMMARY OF THE INVENTION

It is an object of the present invention to provide a speech recognition apparatus which is capable of recognizing speech with high reliability by dividing speech input data into phoneme data with high precision, and individually recognizing the divided phoneme data.

This and other objects are achieved by providing a new and improved speech recognition apparatus including a first acoustic parameter extraction circuit for time-sequentially extracting and generating acoustic parameters in accordance with an input speech signal; a vowel segment determining circuit for determining a vowel segment based on the acoustic parameters extracted by the acoustic parameter extraction circuit; and a phoneme recognition circuit for recognizing phonemes based on the acoustic parameters obtained in the vowel segment and the acoustic parameters obtained in a preceding or succeeding speech segment. The vowel segment determining circuit includes a vowel parameter detecting circuit for detecting a vowel parameter among the acoustic parameters time-sequentially generated after it is detected that an acoustic parameter derived from the acoustic parameter extraction circuit exceeds a predetermined value, and a different acoustic parameter detecting circuit for sequentially calculating the similarities between the vowel parameter thus detected and other acoustic parameters which are sequentially generated in a direction away from the detected acoustic parameter and detecting an acoustic parameter which provides a similarity smaller than a predetermined value and an address thereof which corresponds to the boundary between the vowel and consonant.

In this invention, the vowel parameter is firstly determined based on the extracted acoustic parameters and the boundary between a vowel and consonant is determined by calculating the similarity between the vowel parameter and other extracted acoustic parameters so that the vowel segment may be clearly separated from the adjacent consonant segments. Thus, it becomes possible to recognize vowels and consonants with high reliability.

BRIEF DESCRIPTION OF THE DRAWINGS

FIGS. 8A to 8E illustrate waveforms relating to the speech for explaining the mode of operation of the speech recognition apparatus of this embodiment;

FIGS. 9A to 9F illustrate signal waveforms for explaining the mode of operation of the vowel parameter detecting circuit shown in FIG. 3;

DETAILED DESCRIPTION OF THE PREFERRED EMBODIMENTS

Figure 1:
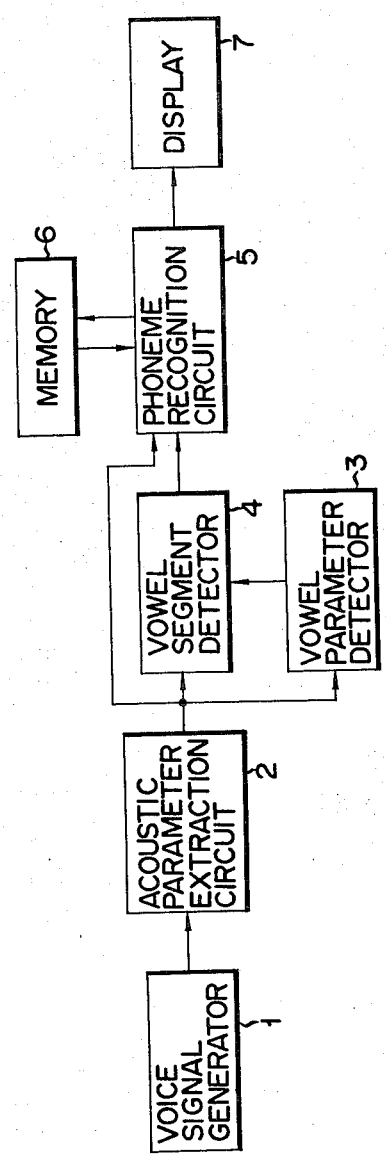
FIG. 1 is a block diagram of a speech recognition apparatus according to an embodiment of the present invention.

FIG. 1 is a block diagram of the speech recognition apparatus according to an embdiment of the present invention. This speech recognition apparatus has a speech signal generator 1 for generating an electrical speech signal according to a voice input, and an acoustic parameter extraction circuit 2 for generating digital data indicative of an acoustic parameter, for example, acoustic power spectrum of the speech input. This acoustic parameter extraction circuit 2 is connected, as will be described hereinafter, to a vowel parameter detecting circuit 3 and a vowel segment detecting circuit 4. In response to an output signal from the vowel segment detecting circuit 4, a phoneme recognition circuit 5 compares the digital data from the acoustic parameter extraction circuit 2 with reference phoneme data stored in a dictionary memory 6, detects the consonants and vowels contained in the speech input, and supplies the detected result to a display unit 7 for display.

Figure 2:
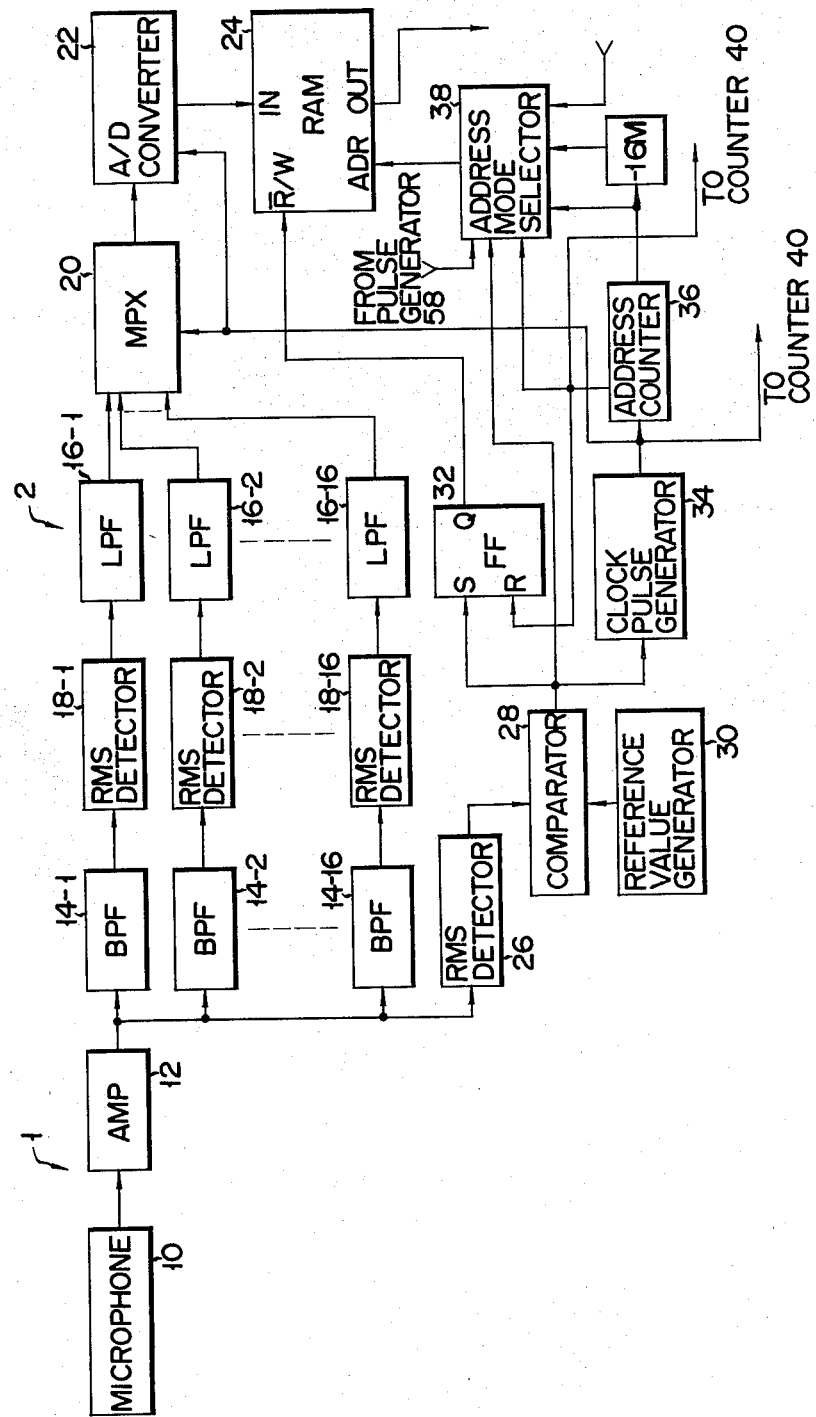
FIG. 2 is a detailed block diagram of the speech signal generating circuit and the acoustic parameter extraction circuit used in the speech recognition apparatus shown in FIG. 1.
Figure 3:
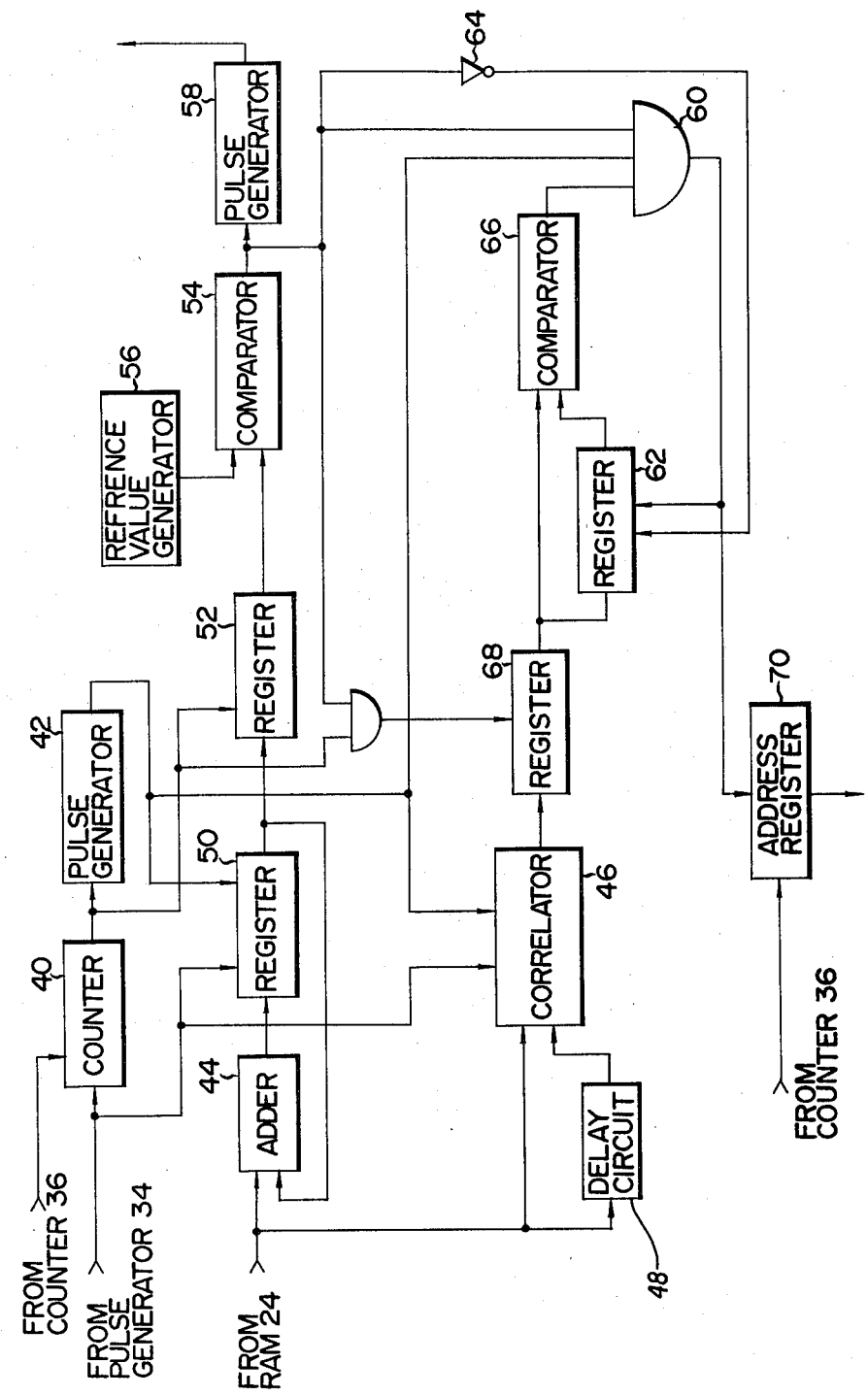
FIG. 3 is a detailed block diagram of the vowel parameter detecting circuit used in the speech recognition apparatus shown in FIG. 1.

Referring primarily to FIG. 1, but also to FIGS. 2 and 3, nextly presented is an overview of the operation of the speech recognition apparatus of the invention based on the function of each of the circuits shown in FIG. 1.

The acoustic parameter extraction circuit 2 extracts one frame of parameter data per, for example, 10 msec in accordance with the voice signal from the voice signal generator 1. The acoustic parameter data of each frame includes 16 acoustic parameter components corresponding to 16 voice signal components which have individually different frequencies. These acoustic parameter components are stored in a memory 24 (FIG. 2) of the acoustic parameter extraction circuit 2 in a sequential order.

The vowel parameter detector 3 sequentially calculates the value of similarity or correlation between two pieces of acoustic parameter data of, for example, two successive frames. The calculation of the correlation value is carried out in a correlator 46 (FIG. 3). The maximum correlation value is detected among the calculated correlation values. It is determined that one of two successive pieces of the acoustic parameter data which have provided the maximum correlation value is the most stable acoustic parameter data or vowel parameter data. The address register 70 (FIG. 3) stores that address of the memory 24 in which this most stable acoustic parameter data is stored.

The vowel segment detector 4 calculates the similarity value between the most stable acoustic parameter data and each of pieces of acoustic parameter data which are stored, for example, in the lower addresses than the address of the most stable acoustic parameter data. When the similarity value becomes smaller than a predetermined value, the vowel segment detector 4 detects the address of the acoustic parameter data which is then generated from the memory 24. This address is discriminated to be the address which determines the starting point of a vowel segment or interval. Therefore, a set of acoustic parameter data, which are stored in the addresses lower than the discriminated address, is determined to be consonant parameter data. Similarly, the vowel segment detector 4 detects the address which determines the end point of a vowel interval by reading out the acoustic parameter dat in an upper address direction starting from the address of the most stable acoustic parameter data.

The phoneme recognition circuit 5 calculates the value of similarity between the consonant parameter data and the reference parameter data stored in the memory 6 to determine the consonant.

FIG. 2 is a detailed block diagram of the speech signal generating circuit 1 and the acoustic parameter extraction circuit 2 shown in FIG. 1. The speech signal generating circuit 1 has a microphone 10 for converting a speech input into an electrical speech signal and an amplifier 12 for amplifying the output signal from the microphone 10. The acoustic parameter extraction circuit 2 has band-pass filters 14-1 to 14-16 coupled to the output terminal of the amplifier 12, low-pass filters 16-1 to 16-16 coupled to the output terminals of these band-pass filters through root-mean-square value detecting circuits 18-1 to 18-16, respectively, and a multiplexer 20 coupled to the output terminals of the low-pass filters 16-1 to 16-16. The band-pass filters 14-1 to 14-16 each have frequency pass bands corresponding to the 16 frequency bands obtained by dividing the frequency range of the recognizable speech into 16 bands. The R.M.S. value detecting circuits 18-1 to 18-16 receive the voice signal components from the band-pass filters 14-1 to 14-16, respectively, and generate output signals corresponding to the R.M.S. values of the acoustic powers of these speech signal components. The multiplexer 20 sequentially supplies the output signals from the low-pass filters 16-1 to 16-16 to an A/D converter 22 in a preset order, for example, in a direction from low to high frequency band. The A/D converter 22 supplies a digital signal corresponding to the output signal from the multiplexer 20 to a RAM 24 having, for example, $16 \times M$ bytes.

The acoustic parameter extraction circuit 2 further includes an R.M.S. value detecting circuit 26 for receiving a speech signal from the speech signal generator 1 and for generating an output signal corresponding to the R.M.S. value of the acoustic power of this speech signal, and a comparison circuit 28 for comparing the output signals from the R.M.S. value detecting circuit 26 and from a reference value generator 30 and for supplying an output pulse to the set terminal of a flip-flop circuit 32 and to a clock pulse generator 34 when the output signal from the R.M.S. value detecting circuit 26 becomes larger than the output signal from the reference value generator 30. In response to the output pulse from the comparison circuit 28, the clock pulse generator 34 supplies clock pulses to the multiplexer 20, the A/D converter 22, and an address counter 36. The address counter 36 supplies an output signal to the address terminal of the RAM 24 through an address mode selector 38 as well as to the reset terminal of the flip-flop circuit 32 when a predetermined count has been achieved. The output terminal Q of the flip-flop circuit 32 is coupled to the read/write mode setting terminal of the RAM 24.

FIG. 3 is a detailed block diagram of the vowel parameter detector 3. The vowel parameter detector 3 has a sexadecimal counter 40 which is reset in response to the output pulse generated by the address counter 36 of the acoustic parameter extraction circuit 2 shown in FIG. 2 when the contents of the address counter 36 has reached 16 M. The sexadecimal counter 40 counts the clock pulses from the clock pulse generator 34 and generates a pulse every time it has counted 16 clock pulses. The vowel parameter detector 3 further has a pulse generator 42 for generating an output pulse in response to the output pulse of the sexadecimal counter 40. The vowel parameter detector 3 also includes an adder 44 for receiving, at its first input terminal, the output data from the RAM 24, and a correlation circuit 46 which receives, at its first input terminal, the output data from the RAM 24 and, at its second input terminal, the output data from the RAM 24 through a delay circuit 48 with a delay time equal to the time required for the clock pulse generator 34 to generate 16 pulses. The second input terminal of the adder 44 is coupled to the output terminal of a register 50 having an input terminal coupled to the output terminal of the adder 44. The output terminal of the register 50 is also coupled, through a register 52, to an input terminal of a comparison circuit 54 which receives, at its other input terminal, the output signal of a reference value generator 56. The comparison circuit 54 supplies a high level output signal to a pulse generator 58 and an AND gate 60 and applies a clear signal to a register 62 through an inverter 64 while the output signal of the register 52 has a value larger than the reference value from the reference value generator 56. In response to the falling edge of the output signal from the comparison circuit 54, the pulse generator 58 generates a pulse. The AND gate 60 is coupled at its second input to the output terminal of the pulse generator 42 and, at its third input terminal, to the output terminal of a comparison circuit 66. The comparison circuit 66 is coupled, at its first input terminal, to the output terminal of the correlation circuit 46 through a register 68 and, at its second input terminal, to the output terminal of the register 62. The output signal from the AND gate 60 is supplied as a latch signal to the register 62 and to an address register 70 whose input terminal is coupled to the output terminal of the address counter 36.

Figure 4:
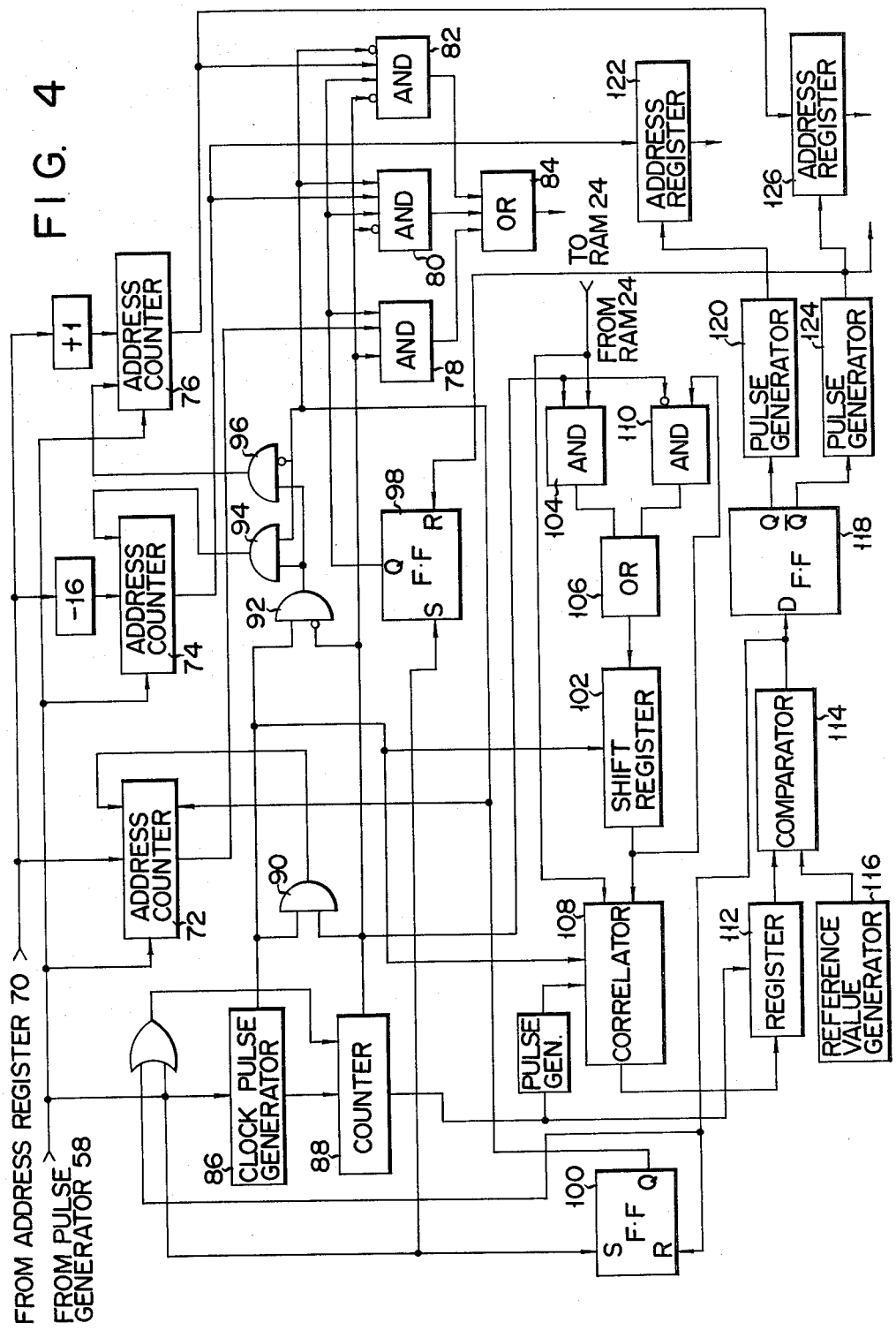
FIG. 4 is a detailed block diagram of the vowel segment detecting circuit used in the speech recognition apparatus shown in FIG. 1.

FIG. 4 is a circuit diagram of the vowel segment detecting circuit 4 shown in FIG. 1. The vowel segment detecting circuit 4 has a presettable up-down counter 72 which is set to have an output address count of 16 N of the address register 70 in response to an output pulse from the pulse generator 58 shown in FIG. 3; a presettable down-counter 74 which is set to have an address count of 16 (N−1) in response to an output pulse from the pulse generator 58; and a presettable up-counter 76 which is set to have an address count of (16 N+1) in response to an output pulse from the pulse generator 58. The counts of these address counters 72, 74 and 76 are supplied to the address terminal of the RAM 24 through respective AND gate circuits 78, 80 and 82, an OR gate circuit 84, and the address mode selector 38 (FIG. 2). The vowel segment detecting circuit 4 has a clock pulse generator 86 which generates clock pulses in response to the output pulse of the pulse generator 58, and a counter 88 which counts the clock pulses from the clock pulse generator 86 and which generates a high level output signal from the first output terminal when its contents indicate a count of 0 to 16 and generates an output pulse from the second output terminal every time it has counted 16 clock pulses. The output pulse from the clock pulse generator 86 is supplied through an AND gate 90 to the address counter 72, through AND gates 92 and 94 to the address counter 74, and through AND gates 92 and 96 to the address counter 76. The AND gates 90 and 92 are controlled by the output signal from the first output terminal of the counter 88.

Flip-flop circuits 98 and 100 are set by the output pulse of the pulse generator 58. The AND gate circuit 78 is controlled by the output signal from the second output terminal of the counter 88 and the Q output signal from the flip-flop circuit 98. The AND gate circuits 80 and 82 are controlled by the output signal from the second output terminal of the counter 88 and the Q output signal from the flip-flop circuits 98 and 100. The AND gates 94 and 96 are controlled by the Q output signal from the flip-flop circuit 100.

The data read out from the RAM 24 (FIG. 2) is supplied to a 16-stage shift register circuit 102 through an AND gate circuit 104 and an OR gate circuit 106. The output signal from this shift register circuit 102 is supplied to a correlation circuit 108 and is also returned to the input terminal of the this shift register 102 through an AND gate circuit 110 and the OR gate circuit 106. The output signal from the correlation circuit 108 is temporarily held in a register 112 and is compared with the output signal of a reference value generator 116 at a comparator 114. This comparator 114 resets the counter 88 and the flip-flop circuit 100 and supplies the output signal to a D-type flip-flop circuit 118 when the content of the register 112 is smaller than a predetermined value. In response to the rising edge of the Q output signal from the flip-flop circuit 118, a pulse generator 120 supplies an output pulse to an address register 122, and sets the count data of the address counter 74 into this address register 122. In response to the rising edge of the Q̄ output signal from the flip-flop circuit 118, a pulse generator 124 resets the flip-flop circuit 98, supplies an output pulse to an address register 126, and sets the count data of the address counter 76 into the address register 126.

Figure 5:
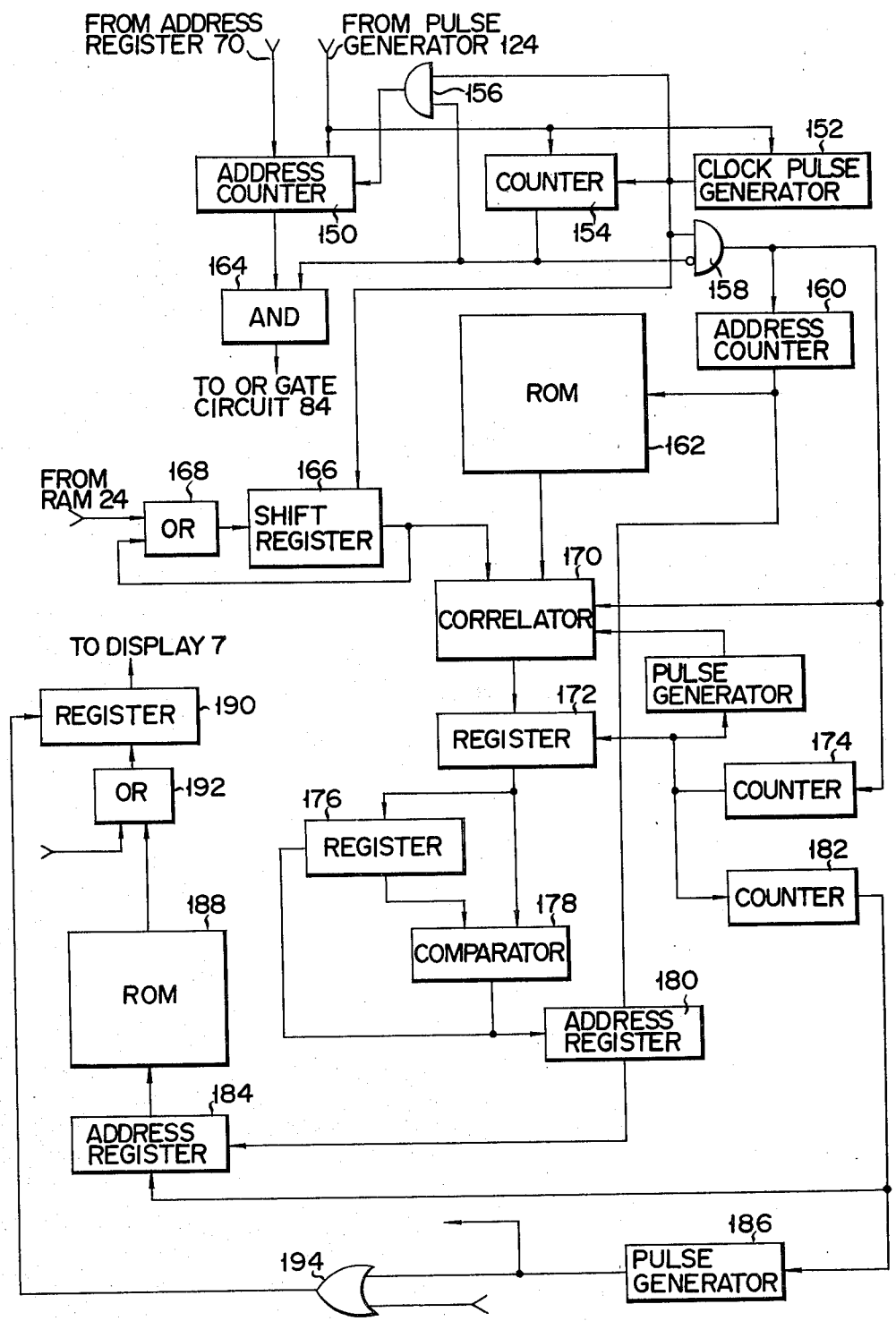
FIGS. 5 and 6 are detailed block diagrams of the vowel recognition section and the consonant recognition section, respectively, of the phoneme recognition circuit used in the speech recognition apparatus shown in FIG. 1.

FIG. 5 shows the vowel recognition section of the phoneme recognition circuit 5 shown in FIG. 1. The vowel recognition section has an address down-counter 150 which is set to have a count equal to the address data of the address register 70 shown in FIG. 3 in response to an output pulse from the pulse generator 124 shown in FIG. 4; a clock pulse generator 152 for generating clock pulses in response to the output pulse of the pulse generator 124; and a counter 154 for counting the clock pulses from the clock pulse generator 152 and for generating a high level output signal when it has a count of 0 to 16. The clock pulses from the clock pulse generator 152 are supplied to the address counter 150 through an AND gate 156 and are also supplied through an AND gate 158 to an address counter 160 for designating the address of a ROM 162 in which reference vowel power spectrum data are stored. The output data from the address counter 150 is applied to the address terminal of the RAM 24 (FIG. 2) through an AND gate circuit 164. The output data from the RAM 24 is supplied to a 16-stage shift register 166 through an OR gate circuit 168. The output data of the shift register 166 and the output data from the ROM 162 are supplied to a correlation circuit 170. A register 172 temporarily stores the output data from the correlation circuit 170 in response to an output pulse from a counter 174 which generates a pulse every time it has counted 16 clock pulses from the clock pulse generator 152. A comparator 178 compares the data stored in the register 172 with data stored in a resister 176. The comparator 178 permits the data stored in the register 172 to be set into the register 176 and the count data of the address counter 160 to be set into an address register 180 when the stored data in the register 172 is greater than the stored data in the register 176. A counter 182 supplies an output pulse to an address register 184 and a pulse generator 186 when it has counted a predetermined number of pulses from the counter 174, that is, when the calculation for correlation between all the vowel power spectrum data stored in the ROM 162 and the vowel power spectrum data stored in the shift register 166 is completed. Accordingly, into the address register 184, the same address data as that stored in the address register 180 is set and the address register 184 designates the address for a ROM 188 in which vowel data are stored. In response to the address data from the address register 184, the vowel data read out from the ROM 188 is supplied to a register 190 through an OR gate circuit 192. In response to the output pulse from the counter 182, the pulse generator 186 supplies a set pulse to the register 190 through an OR gate 194 and permits the vowel data from the ROM 188 to be stored in the register 190.

Figure 6:
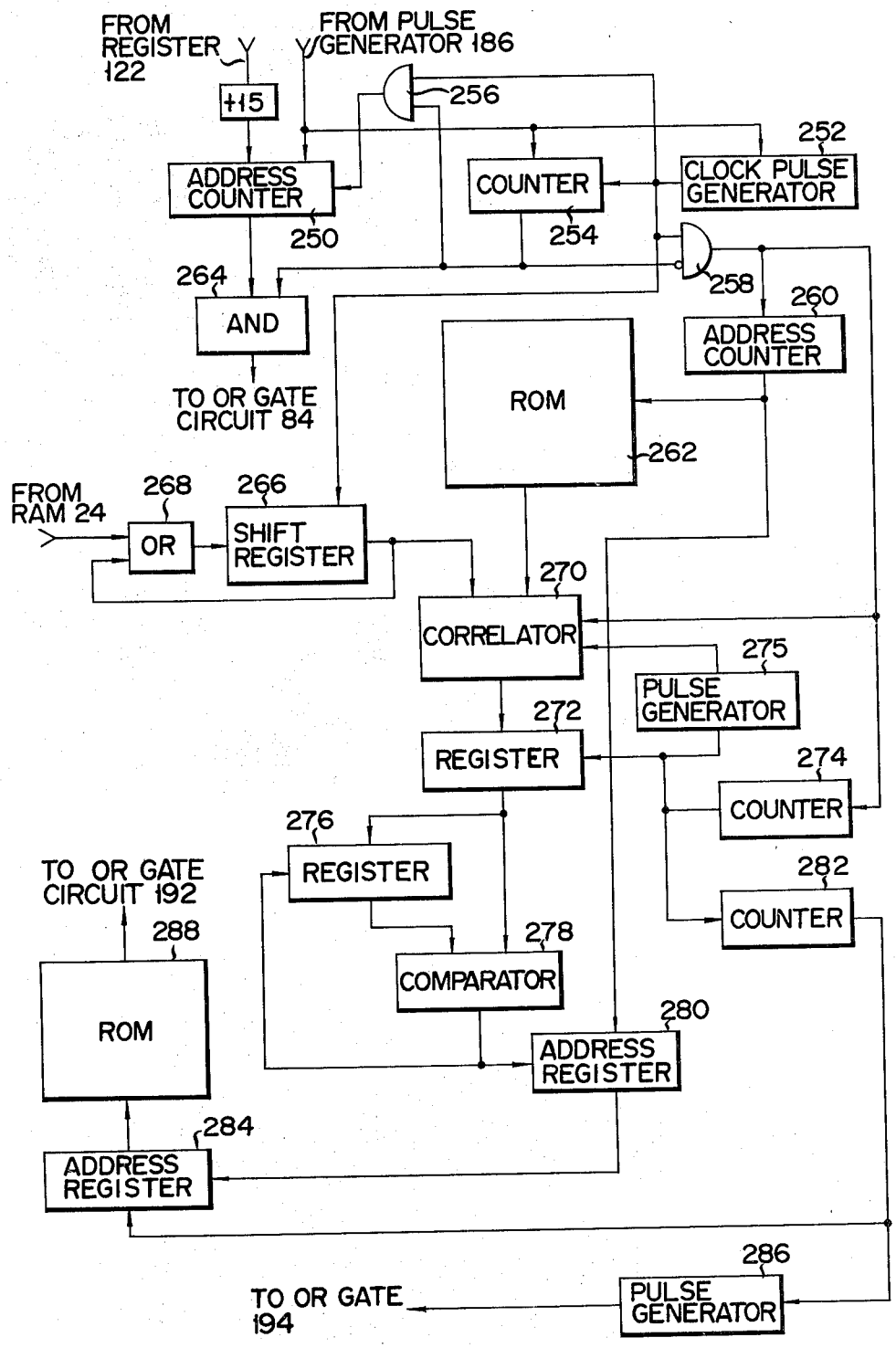

FIG. 6 shows the consonant recognition section of the phoneme recognition circuit 5 shown in FIG. 1. Since a consonant recognition section is of the similar construction to that of the vowel recognition section shown in FIG. 5, corresponding parts are designated by similar reference numerals, with only the hundred digit differing. Therefore, only the parts which are different will be described.

In response to the output pulse from the pulse generator 186 shown in FIG. 5, a presettable down-counter 250 is loaded with an address count which is obtained by adding 15 counts to the address count of the address register 122. A counter 254 counts the clock pulses from a clock pulse generator 252 and generates a high level output signal when the counted contents are, for example, 0 to 16×16. A ROM 262 stores the consonant power spectrum data. A shift register 216 has 16×16 stages. A counter 274 generates a pulse every time it has counted 16×16 clock pulses from the clock pulse generator 252, and a ROM 288 generates the consonant data in response to an address signal from an address register 284.

Figure 7:
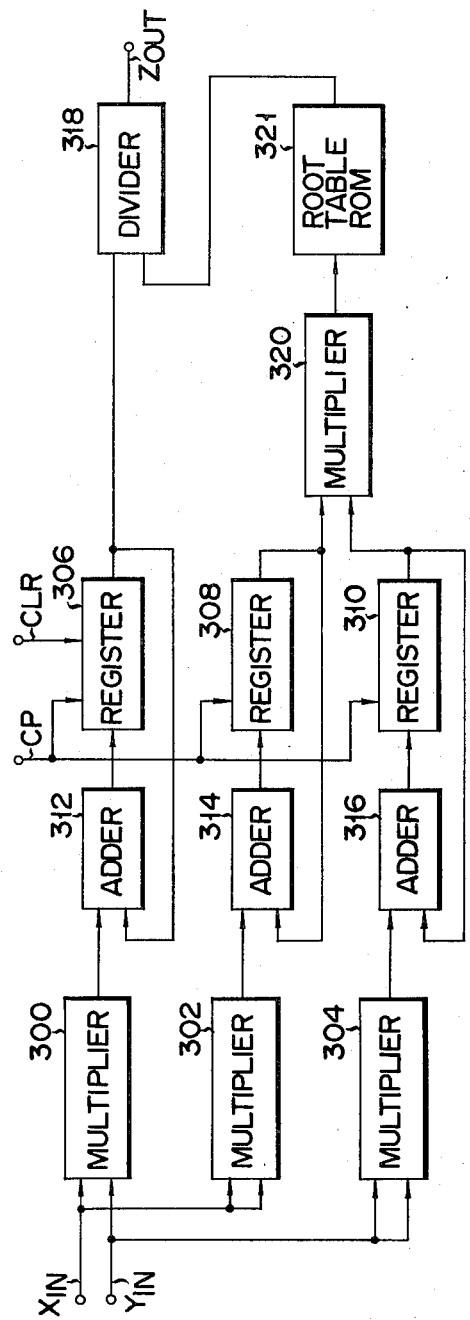
FIG. 7 is a block diagram of the correlation circuit used in this embodiment.

FIG. 7 is a circuit diagram illustrating in detail the circuit construction of the correlation circuits 46, 108, 170 and 270, used in the circuits shown in FIGS. 3 to 6. This correlation circuit has a multiplier 300 for receiving two input signals XIN and YIN, a multiplier 302 for receiving the input signal XIN at both input terminals, and multiplier 304 for receiving the input signal YIN at both input terminals. These multipliers 300, 302 and 304 are coupled to registers 306, 308 and 310 through adders 312, 314 and 316, respectively. The output terminal of the register 306 is coupled to the input terminal of the adder 312 as well as to a divider 318. The output terminals of the registers 308 and 310 are coupled to the input terminals of the adders 314 and 316 as well as to the two input terminals of a multiplier 320 whose output terminal is coupled to the divider 318 through a root table ROM 321. The output signal of the divider 318 is the output signal ZOUT of the correlation circuit.

When the input signals XIN1 and YIN1 are supplied to the correlation circuit at a time ti, output signals XIN1·YIN1 and XIN1$^2$ and YIN1$^2$ are obtained from the multipliers 300, 302, and 304, and are stored in the registers 306, 308, and 310 through the adders 312, 314 and 316 by a clock pulse CP generated at the time ti. The output signal (XIN1$^2$·YIN1$^2$) is obtained from the multiplier 320 and the output signal $\sqrt{XIN1^2 \cdot YIN1^2}$ is generated from the root table ROM 321 so that correlated output signal ZOUT1 from the divider 318 may be given by the following equation:

$$ZOUT1 = \frac{XIN1 \cdot YIN1}{\sqrt{XIN1^2 \cdot YIN1^2}} \tag{1}$$

When input signals XIN2 and YIN2 are obtained at the next time t2, the adders 312, 314 and 316 generate output signals [XIN1·YIN1+XIN2·YIN2] and [(YIN1$^2$+YIN2$^2$)] and [(YIN1$^2$+YIN2$^2$)]. The correlated output signal ZOUT2 obtained in this case is represented by the following equation:

$$ZOUT2 = \frac{(XIN1 \cdot YIN1 + XIN2 \cdot YIN2)}{\sqrt{(XIN1^2 + XIN2^2)(YIN1^2 + YIN2^2)}} \tag{2}$$

As may be apparent from equations (1) and (2), the correlation output signal ZOUTi at the time ti may be represented by the following equation:

$$ZOUTi = \frac{\Sigma XINi \cdot YINi}{\sqrt{\Sigma XINi^2 \cdot \Sigma YINi^2}} \tag{3}$$

The mode of operation of the voice recognition device shown in FIGS. 1 to 6 will be described referring to FIGS. 9A to 9F and 10A to 10D.

When a speech sound [SAN] is produced in the vicinity of microphone 10 shown in FIG. 2 a voice output signal is generated from the amplifier 12 which has the acoustic power characteristics shown in FIG. 8A (the acoustic power and the time are plotted along the ordinate and the abscissa, respectively). FIG. 8B shows the power spectrum (the frequency and the time are plotted along the ordinate and the abscissa, respectively, and the difference between the adjacent power spectra represents the acoustic power). This speed output signal is supplied to the band-pass filters 14-1 to 14-16 having 16 different frequency pass bands as well as to the R.M.S. value detecting circuit 26. When the comparision circuit 28 detects that the output signal from the R.M.S. value detecting circuit 26 has become larger than the reference value of the reference value generator 30, that is, that the acoustic power of the voice input signal has become larger than a predetermined value, the comparision circuit 28 generates an output signal. The flip-flop circuit 32 is thereby set to supply a write mode setting signal to the RAM 24 to set the RAM 24 in the write mode. The address mode selector 38 is then set in the write-in address mode, and the clock pulse generator 34 starts generating clock pulses. In response to the clock pulses from the clock pulse generator 34, the multiplexer 20 sequentially supplies the acoustic power output signals from the low-pass filters 16-1 to 16-16 to the A/D converter 22. This A/D converter 22 converts the respective acoustic power signals sequentially supplied from the multiplexer 20 into digital data of, for example, 8 bits, and supplies the digital data to the RAM 24. The address counter 36 supplies, through the address mode selector 38, an address signal which changes according to the clock pulses from the clock pulse generator 34 to the RAM 24 as a write-in address signal. Thus, the data on the acoustic power of the voice input signal which changes with time and at every frequency band is sequentially written in the RAM 24. As for the writing operation into the RAM 24, when the clock pulse generator 34 has generated 16 M pulses, the address counter 36 generates a reset signal from the second output terminal to reset the flip-flop circuit 32. Then, the RAM 24 is set in the reading operation mode, the address mode selector 38 is set in the first readout address mode, and the address signal from the address counter 36 is supplied to the RAM 24 as the address signal through the address mode selector 38 after it is subtracted by 16 M. In this manner, the acoustic power data stored in the RAM 24 is sequentially read out at addresses from the first address location toward a higher order address location.

When the content of the address counter 36 becomes 16 M, the counter 40 of the vowel parameter detecting circuit 3 is set in the initial status by the output pulse generated by the address counter 36; the counter 40 counts the clock pulses from the pulse generator 34 shown in FIG. 9A and generates an output pulse each time 16 clock pulses have been counted, as shown in FIG. 9B. The acoustic power data from the first to sixteenth address locations is sequentially supplied from the RAM 24 to the adder 44. The added data is temporarily stored in the register 50, and the total sum of the sixteen acoustic power data values is stored in the register 52 in response to the output pulse from the counter 40. In response to the output pulse from the counter 40, the pulse generator 42 generates a clear pulse as shown in FIG. 9C to clear the contents of the correlation circuit 46 and the register 50. In response to the output pulse from the counter 40, the register 52 sequentially temporarily stores the data of the total sum of the sixteen acoustic power data values read out from the RAM 24, that is, the data of the individual acoustic power spectra. Thus, the acoustic power output data of the register 52 changes along the acoustic power-time characteristic curve shown in FIG. 8C. When the acoustic power output data from the register 52 becomes greater than a predetermined value at the time t1, for example, when the leading edge of the prospective period of the vowel segment is detected, the comparator 54 generates a high level signal as shown in FIG. 9D.

The acoustic power data read out from the RAM 24 at the address location A[16P+1] (where P is a positive integer) and the acoustic power data at the address location A[16P−15] are supplied to the correlation circuit 46 and are processed in a manner similar to that described with reference to FIG. 7. The calculation result obtained by the correlation circuit 46 while the comparator 54 is generating the high level output signal is temporarily stored in the register 68 every time a pulse is generated from the counter 40. Thus, the register 68 stores the correlation data of the two adjacent acoustic power spectra. The output correlation data from the register 68 changes along the correlation curve shown in FIG. 8D. When it is detected that the register 68 stores a correlation data value larger than that stored in the register 62, the comparator 66 generates an output pulse as shown in FIG. 9E. In this case, the clock pulse (FIG. 9C) from the pulse generator 42 is supplied to the register 62 and the address register 70 through the AND gate 60, the content of the register 68 is stored in the register 62, and the present count of the address counter 36 is stored in the address register 70.

When it is detected that the acoustic data value stored in the register 68 is smaller than the acoustic power data value stored in the register 62 at the time t2, the comparator 66 no longer generates an output pulse. The AND gate 60 is disabled and the contents of the register 62 and the address register 70 are no longer changed. Thus, the address data for the address location A[16Q] (where Q is a positive integer) which is the highest address location of the sixteen address locations designating the optimal vowel spectrum data, that is, the vowel spectrum data which provides the maximum correlation data, is stored in the address register 70. Thereafter, when the acoustic data stored in the register 52 becomes smaller than the predetermined value at the time t3 as shown in FIG. 8C, that is, when the trailing edge of the prospective period of the vowel segment is detected, the comparator 54 generates a low level signal as shown in FIG. 9D. In response to the falling edge of the output signal from the comparator 54, the pulse generator 58 generates an output pulse as shown in FIG. 9F.

Figures 10A, 10B, 10C, 10D:
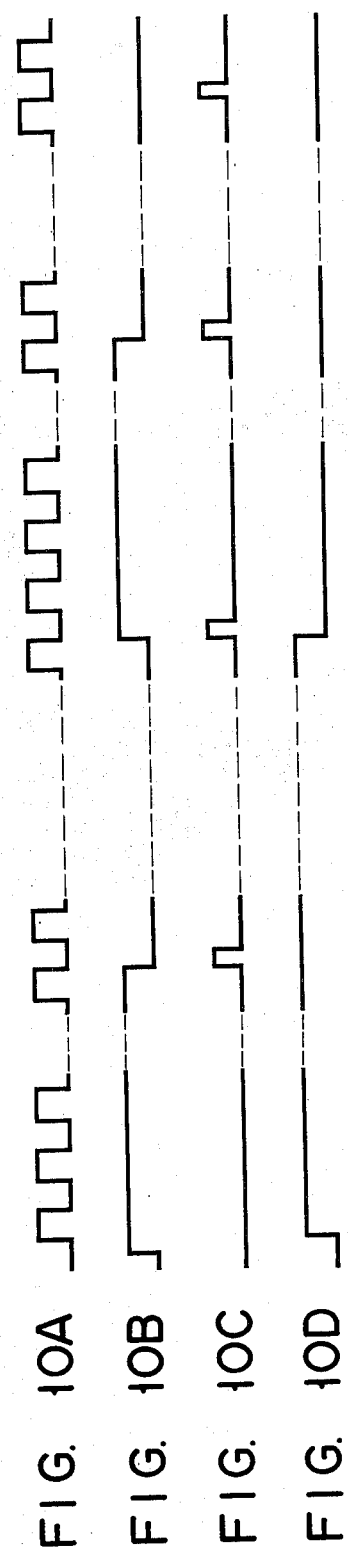
FIGS. 10A to 10D illustrate signal waveforms for explaining the mode of operation of the vowel segment detecting circuit shown in FIG. 4.

The output pulse from the pulse generator 58 is supplied to the address mode selector 38 shown in FIG. 2 to set the address mode selector 38 in the second readout address mode. This output pulse is also supplied to the counter 88, the clock pulse generator 86, the address counters 72, 74 and 76, and the flip-flop circuits 98 and 100 shown in FIG. 4. The vowel segment detecting operation is thus initiated. The clock pulse generator 86 starts generating clock pulses as shown in FIG. 10A, and the counter 88 generates a high level signal as shown in FIG. 10B. The flip-flop circuits 98 and 100 are set, and the address counters 72, 74 and 76 are set to have counts corresponding to the address data [16Q], [16Q−16] and [16Q+1], respectively.

Since the counter 88 generates the high level signal as shown in FIG. 10B until 16 clock pulses from the generator 86 are connected, the clock pulses generated by the clock pulse generator 86 during this period are applied to the address counter 72 through the AND gate 90. Since the address counter 72 is set in the down count mode by the Q output signal of high level from the flip-flop circuit 100, it counts down the contents thereof in response to the clock pulses from the clock pulse generator 86. The address count data of the address counter 72 is supplied to the address input terminal of the RAM 24 through the AND gate circuit 78, the OR gate circuit 84, and the address mode selector 38. Then, the data of the optimal vowel power spectrum are read out from the address locations A[16Q] to A[16Q−15] and are sequentially stored in the shift register 102, through the AND gate circuit 104 and the OR gate circuit 106. When all the data on the optimal vowel spectrum are read out and stored in the shift register 102, the output signal from the counter 88 becomes low level and the content of the address counter 72 is held at the address count [16Q−15]. Thereafter, the clock pulses from the clock pulse generator 86 are supplied to the address counter 74 through the AND gates 92 and 94. In response to the clock pulses from the clock pulse generator 86, the address down-counter 74 counts down the contents thereof one by one. The output count of the down-counter 74 is applied to the address input terminal of the RAM 24 through the AND gate circuit 80, the OR gate circuit 84, and the address mode selector 38. Thus, the acoustic power data are sequentially read out from the RAM 24 starting from the address location A[16Q−16] to the lower address locations. The data read out at addresses from the address locations A[16Q−16] to A[16Q−31] in this order are supplied to the correlation circuit 108 together with the output data sequentially generated from the respective stages of the shift register 102. The total sum of the correlations of the respective 16 acoustic power data values read out from the RAM 24 and the respective 16 output data values generated from the shift register 102 is obtained. This result is stored in the register 112 when the output pulse as shown in FIG. 10C is generated from the counter 88. Thus, in this case, the correlation between the data of the vowel power spectrum detected to be optimal and the data of the adjacent power spectrum is stored in the register 112. Next, the total sum of the correlations between the acoustic power data read out at the address locations A[16Q−32] to A[16Q−47] of the RAM 24 and the 16 acoustic power data representing the optimal vowel power spectrum generated from the shift register 102 is calculated. In a similar manner, the acoustic power spectrum data at the lower address locations are sequentially read out from the RAM 24 and their correlations with the optimal vowel power spectrum are calculated. The correlation data is temporarily stored in the register 112. The correlation data stored in the register 112 decreases from the peak toward the left in the correlation curve shown in FIG. 8E. When the content of the register 112 becomes smaller than the predetermined value at the time t4 shown in FIG. 8E, that is, when the leading edge of the vowel segment is detected, an output pulse is generated from the comparator 114. The high level output signal is generated from the flip-flop circuit 118 and the flip-flop circuit 100 is reset to change the Q output signal to a low level signal as shown in FIG. 10D. In response to the rising edge of the Q output signal of the flip-flop circuit 118, the pulse generator 120 supplies an output pulse to the address register 122 so that the present count content of the address counter 76 may be stored in the address register 122. The output pulse from the comparator 114 is also supplied to the counter 88 to set the counter 88. The high level signal is generated from the first output terminal of the counter 88 until 16 clock pulses have been counted as shown in FIG. 10B. The clock pulses from the clock pulse generator 86 are supplied to the address counter 72 through the AND gate 90. In this case, since the address counter 72 has received the low level Q output signal from the flip-flop circuit 100, the address counter 72 is set in the up-counting mode and counts up its content one by one in response to the clock pulses from the clock pulse generator 81. In a manner similar to that described above, 16 clock pulses are generated from the clock pulse generator 86, and 16 acoustic power data representing the vowel power spectrum detected to be optimal are stored in the shift register 102. Thereafter, the output signal from the first output terminal of the counter 88 becomes a low level signal as shown in FIG. 10B. In this case, since the Q output signal from the flip-flop circuit 100 is of low level, the clock pulses from the clock pulse generator 86 are supplied to the address counter 76 through the AND gates 92 and 96. The address counter 76 counts up its content one by one. The output count of the address up-counter 76 is supplied to the address input terminal of the RAM 24 through the AND gate circuit 82, the OR gate circuit 84, and the address mode selector 38. The acoustic power data are sequentially read out from the RAM 24 at addresses from the address location A[16Q+1] toward the higher locations. The acoustic power data read out at addresses from the address locations A[16Q+1] to A[16Q+16] are sequentially supplied to the correlation circuit 108 together with the output data generated from the respective stage of the shift register 102. Then, in a manner similar to that which has been described, the correlation between the data on the optimal vowel power spectrum and the data on the next acoustic power spectra at higher address locations is calculated. This result is stored in the register 112 when the output pulse shown in FIG. 10C is generated from the counter 88. In a similar manner, the correlations between the optimal vowel spectrum data and the individual acoustic power spectra data at the higher address locations are subsequently obtained each time 16 pulses are generated. The results are sequentially and temporarily stored in the register 112. The correlation data stored in the shift register 112 change from the peak toward the right of the correlation curve shown in FIG. 8E. When the content of the register 112 becomes smaller than the predetermined value at the time t5 shown in FIG. 8E, that is, when the trailing edge of the vowel segment is detected, an output pulse is generated from the comparator 114 to generate a $\overline{Q}$ output signal of high level from the flip-flop circuit 118. In response to the rising edge of the $\overline{Q}$ output signal from the flip-flop circuit 118, the pulse generator 124 generates an output pulse. Then, the present count data of the address counter 76 is stored in the address register 126, the flip-flop circuit 98 is reset, and the vowel segment detecting operation is thus terminated.

The output pulse from the pulse generator 124 is supplied to the address counter 150, the clock pulse generator 152, and the counter 154 shown in FIG. 5. This counter 154 is reset and generates an output signal of high level in response to the output pulse from the pulse generator 124. The output signal from the counter 154 is held at the high level until it has counted 16 clock pulses from the clock pulse generator 152. In response to the output pulse from the pulse generator 124, the address counter 150 takes in the address data stored in the address register 70 (FIG. 3). Thus, the address counter 150 is so set as to have a count corresponding to the highest address data among the address data for designating 16 acoustic power data representing the vowel power spectrum detected to be optimal. The address counter 150 counts down its content one by one in response to the clock pulses supplied from the clock pulse generator 152 through the AND gate 156. The output address count of the address counter 150 is supplied to the address input terminal of the RAM 24 through the AND gate circuit 164, the OR gate circuit 84 (FIG. 4), and the address mode selector (FIG. 2). Sixteen vowel power data sequentially read out from the RAM 24 by the address data from the address counter 150 are sequentially stored in the 16-stage register 166 through the OR gate circuit 168. Since the output signal of the counter 154 becomes low level, the AND gate circuit 156 and the AND gate circuit 164 are disabled, and the AND gate circuit 158 is enabled. Then, the clock pulses from the clock pulse generator 152 are supplied to the address counter 160 through the AND gate 158 to count up the content of the address counter 160 one by one. In response to the address count from the address counter 160, the acoustic power data is read out from the ROM 162 and is supplied to the correlator 170 together with the vowel power data from the shift register 166. The total sum of the correlations between the 16 acoustic power data from the shift register 166 and the 16 acoustic power data sequentially read out from the ROM 162, is stored in the register 172 when the output pulse is supplied from the counter 174 to the register 172 after the counter has counted 16 clock pulses. The correlation data stored in the register 172 is compared with the data stored in the register 176 at the comparator 178. The comparator 178 supplies an output pulse to the register 176 and the address register 178 when the correlation data stored in the register 172 is detected to have a value larger than the data stored in the register 176. Then, the register 176 takes in the correlation data stored in the register 172, and the present address count of the address counter 160 is set in the address counter 180.

When the correlations between all the vowel power spectrum data stored in the ROM 162 with the optimal vowel power spectrum data stored in the shift register 166 are obtained, the maximum correlation data is stored in the register 176, and the highest address data among the address data for designating 16 vowel power data values representing the vowel power spectrum having the largest correlation with the optimal vowel power spectrum is stored in the address register 180. When all the vowel power data are read out from the ROM 162, an output pulse is generated by the counter 182, and the address data stored in the address register 180 is stored in the address register 184. The ROM 188 supplies the vowel data at the address location designated by the address data from the address register 184, that is, the vowel data representing [A] in this case, to the register 190 through the OR gate circuit 192. In response to the output pulse generated from the pulse generator 186, the register 190 holds the vowel data from the ROM 188 in the storing section.

The output pulse from the pulse generator 186 is supplied to an address counter 250, a clock pulse generator 252, and a counter 254 shown in FIG. 6. The counter 254 is reset in response to the output pulse from the pulse generator 186 and generates an output signal of high level. The output signal from the counter 254 is held at high level until the counter has counted 16 clock pulses from the clock pulse generator 252. In response to the output pulse from the pulse generator 186, the address counter 250 is set to have a count corresponding to the value obtained by adding 15 to the address data from the address register 122. Thus, the address counter 250 is set to have the count corresponding to the highest address data among the address data for designating the 16×16 acoustic power data representing the consonant power spectrum pattern of 16 consonant power spectra judged to be optimal. In response to the clock pulses supplied from the clock pulse generator 252 through the AND gate 256, the address counter 250 counts down its content one by one. The output address count of the address counter 250 is supplied to the address input terminal of the RAM 24 (FIG. 3). The shift register 266 sequentially stores 16×16 acoustic power data read out from the RAM 24. Since the output signal from the counter 254 becomes low level, the AND gate circuit 264 is disabled and the clock pulses from the clock pulse generator 252 are supplied to the address counter 260 to count up the content of the address counter 260 one by one. In response to the address count from the address counter 260, the acoustic power data is sequentially read out and is supplied to the correlation circuit 270 together with the acoustic power data from the shift register 166. This correlation circuit 270 calculates the correlation between the two input signals which are changing with time, as has been described with reference to FIG. 7, and produces its total sum. The calculated results of the correlation circuit 270 are stored in the register 272 by the output pulse generated from the counter 274 after it has counted 16×16 clock pulses from the clock pulse generator 252, and are cleared by the clear pulse generated from the pulse generator 275.

The correlation data stored in the register 272 is compared with the content of the register 276 by the comparator 278. When it is detected that the register 272 has a data value greater than that of the register 276, the comparator 278 generates an output pulse. Then, the correlation data of the register 272 is stored in the register 276, and the present content of the address counter 260 is stored in the address register 280.

The correlations between the acoustic spectrum pattern data representing the 16 acoustic power spectra stored in the shift register 266, and a plurality of acoustic power spectrum pattern data each representing the 16 acoustic power spectra stored in the ROM 262, are sequentially calculated. When the correlation calculation for all the acoustic power spectrum pattern data is completed, that one of the plurality of acoustic power spectrum pattern data in the ROM 262 which has the maximum correlation with respect to acoustic spectrum pattern data in the shift register 266 is stored in the register 276. The highest address data among the address data for designating the 16×16 acoustic power-data values representing the acoustic power sepctrum pattern data judged to be optimal in the ROM 262 is stored in the address register 280. When all the acoustic power data values are read out from the ROM 262, an output pulse is read out from the counter 282, and the address data stored in the address register 280 is set in the address register 284. The ROM 288 supplies the acoustic data, the data representing [S] in this case, from the address location designated by the address data stored in the address register 284 to the register 190 through the OR gate circuit 192. In response to the output pulse from the pulse generator 286, the register 190 holds the phoneme data from the ROM 288 in the second storing section.

Figure 11:
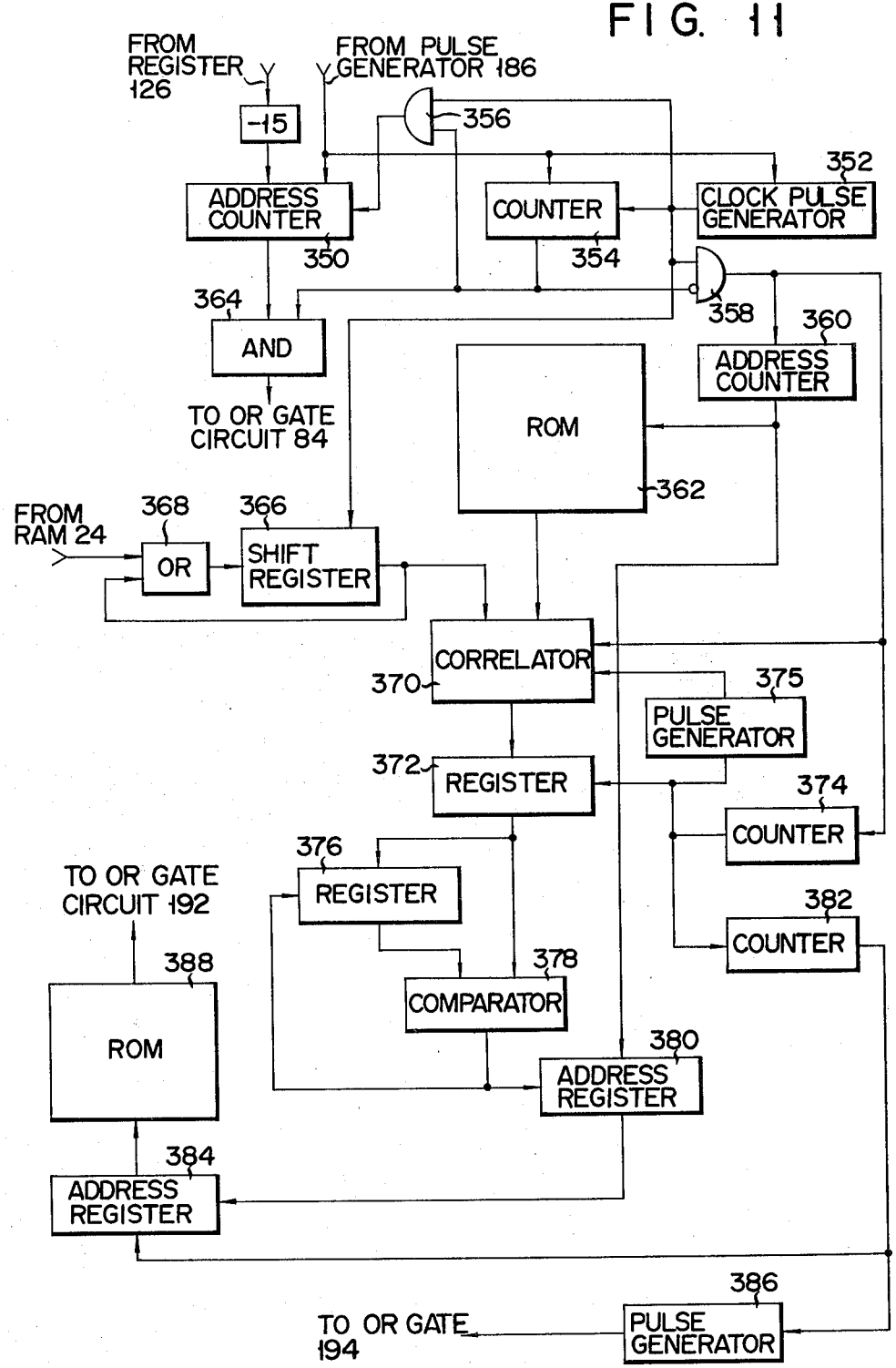
FIG. 11 is a block diagram of the consonant recognition section which may be used with the consonant recognition section shown in FIG. 6.

Although the present invention has been described with reference to the embodiment above, the present invention is not by any means limited to this particular embodiment. For example, in the above embodiment, a vowel and the preceding phoneme of the vowel are detected. However, the succeeding phoneme of the vowel may also be detected by using the circuit shown in FIG. 11. The circuit shown in FIG. 11 is the same as that shown in FIG. 6 except that the address counter 350 is set to have a count corresponding to the value obtained by subtracting 15 from the address count of the register 126 in response to the output pulse of the pulse generator 286, and that the address counter 350 counts up one by one in response to the clock pulses from the clock pulse generator 352. In the circuit shown in FIG. 11, the corresponding parts are designated by similar reference numerals, with only the hundred digit differing.

Figure 12:
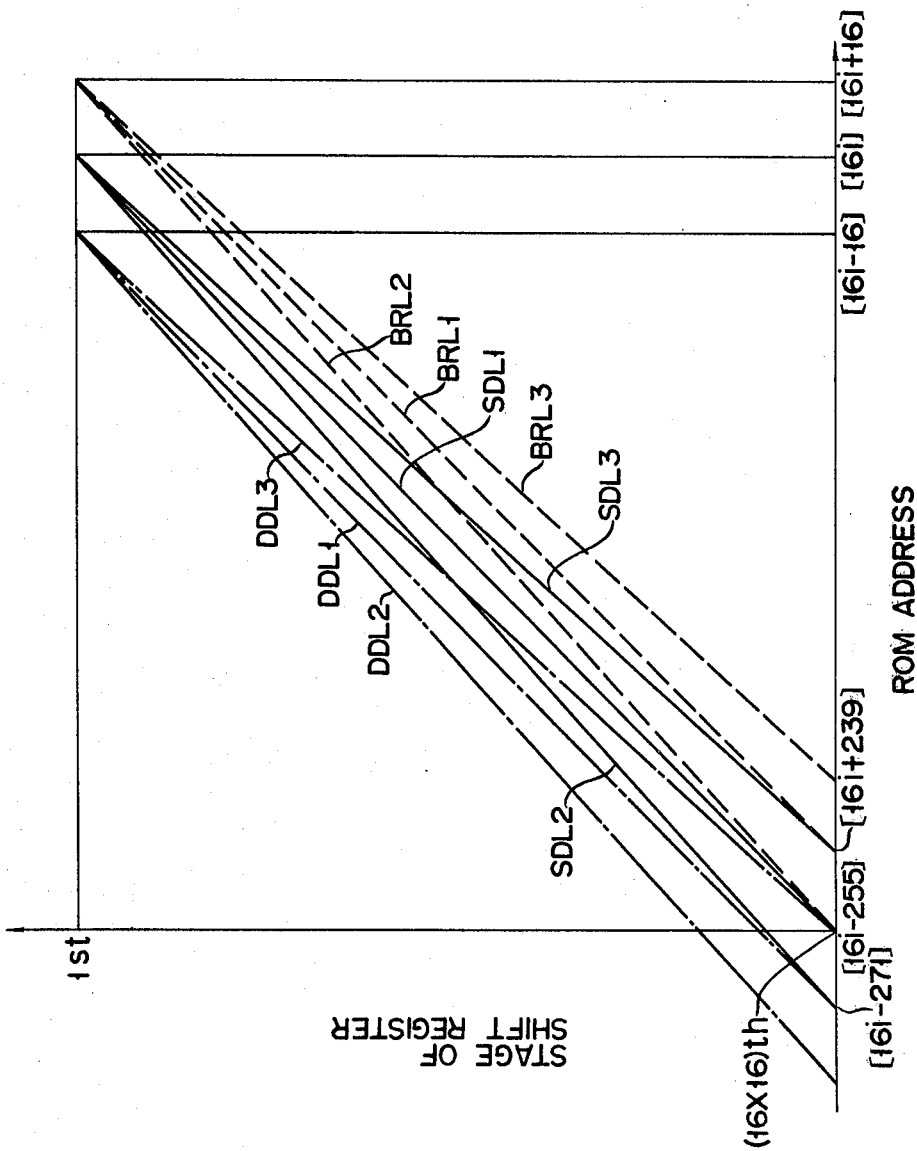
FIG. 12 is a view for illustrating the manner of accessing the address in the dictionary memory shown in FIG. 12.
Figure 13:
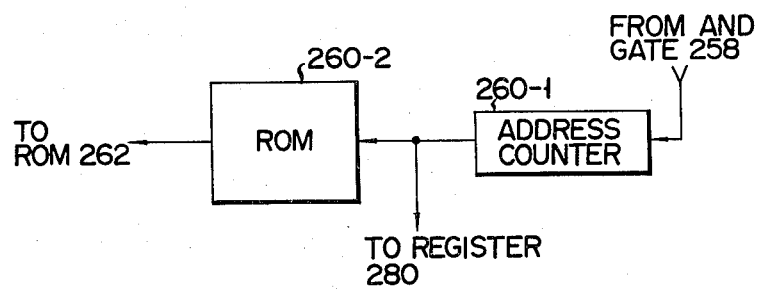
FIG. 13 illustrates an address designation circuit for the dictionary memory used for executing the consonant recognition method shown in FIG. 12.

Instead of the 16×16 stage shift register 266 used in the circuit shown in FIG. 6, it is also possible to use a RAM having 16×16 address locations. The circuit shown in FIG. 6 is conventionally known as a circuit for performing the phoneme recognition, and a predetermined number of mutually different kinds of reference acoustic power spectrum pattern data are stored in the ROM 262. With this ROM 262, only one reference acoustic power spectrum pattern data represents one phoneme. Thus, in order to obtain a recognition result with a high reliability, it is desired to represent a phoneme by a plurality of mutually different reference acoustic power spectrum pattern data, and to obtain the correlation of these acoustic power spectrum pattern data with the acoustic power spectrum pattern data read out from the RAM 24. In order to achieve this, it suffices to change the relation between the data readout stages of the shift register 266 with the readout address of the ROM 262 as shown in FIG. 12. For example, a case will be described wherein the acoustic power spectrum pattern data read out from the addresses A[16i] to A[16i−255] are correlated with the acoustic power spectrum pattern data of the shift register 266. In this case, the address designation circuit as shown in FIG. 13 is used in place of the address counter 260 in FIG. 6.

Thus, this designation circuit has an address counter 260-1 for counting the clock pulses from the clock pulse generator 258, and a ROM 262-2 which receives the output count from the address counter 260-1 at the address input terminal and generates the address signal to the ROM 262. The address designation circuit shown in FIG. 13 designates one of the addresses A[16i] to A[16i−255] of the ROM 262 in this order as the acoustic power data is read out from the shift register 266 from the first to 16×16th stage as shown by the solid line SDL1 of FIG. 12. Every time the acoustic power data is read out from the shift register 266, it designates one of the addresses A[16i−16] to A[16i−271] of the ROM 262 in this order as shown by the dash and dot line DDL1. Thereafter, every time the acoustic power data is read out from the shift register 266, it designates one of the addresses A[16i+16] to A[16i−239] of the ROM 262 in this order as shown by the broken line BRL. Furthermore, the address designation circuit designates the address of the ROM 262 every time the data is read out from the shift register 266 to satisfy the relations shown by the solid lines SDL2 and SDL3, the dash and dot lines DDL2 and DDL3, and the broken lines BRL2 and BRL3. Thus, a more certain consonant recognition may be obtained by using a plurality, 9 in this case, of different acoustic power spectrum pattern data all corresponding to the same phoneme. In this case, it is important to vary only slightly those addresses for the nine different acoustic power spectrum data which are close to the address location for designating the vowel power spectrum data judged to be optimal and to vary more those addresses which are farther separated from the address location for designating the optimal vowel power spectrum data. A similar effect may also be obtained by using the address counter 260 without modification but by storing in the ROM 262 a plurality of, for example, nine different acoustic power spectrum pattern data for each phoneme. In this case, it should be noted that the nine different acoustic spectrum pattern data are read out from the ROM 262 so as to attain the same effect obtained in the example explained with reference to FIG. 12.

Figure 14:
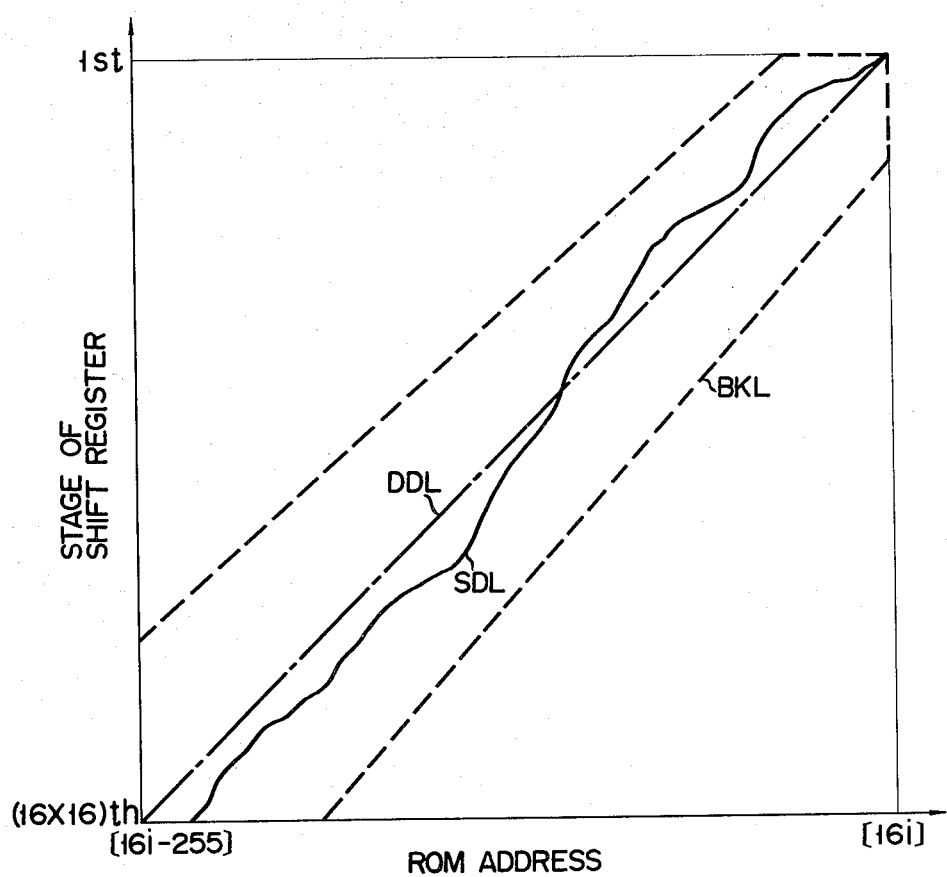
FIG. 14 is a view for illustrating the dynamic programming technique which may be used for consonant recognition.

The phoneme recognition may also be achieved by the generally known dynamic programming technique as shown in FIG. 14. The correlation of the output data from one stage of the shift register 266 and the output data read out from a plurality of the address locations which correspond to that one stage and can be designated within the range surrounded by the broken line BRL shown in FIG. 14 is obtained to detect the address location to provide a maximum value. By connecting these address locations, the line data as shown by the solid line SDL may be obtained. This line data is obtained for every acoustic power spectrum pattern data, and one which has the maximum similarity with the line data represented by the dash and dot line DDL is selected as the effective data. It should be noted that this dynamic programming is performed such that the number of data read out from the ROM 262 for correlation with the highest stage or the high order stage of the shift register 266 is smaller than the number of the data read out from the ROM 262 for correlation with the lowest stage or the low order stage of the shift register 266.

Although a correlator was used for calculating the similarity of two acoustic power spectrum data in the above embodiment, it is also possible to use a known subtractor for calculating the similarity.

What is claimed is:

1. A speech recognition apparatus comprising:
   speech signal generating means for generating a speech signal based on spoken words including at least a consonant and a vowel following the consonant;
   acoustic parameter data extracting means for extracting acoustic parameter data from the speech signal, including memory means for time-sequentially storing acoustic parameter data;
   vowel detecting means for obtaining a vowel parameter data and a vowel address thereof, which includes receiving means for sequentially receiving acoustic parameter data from said memory means, correlator means for choosing from among the acoustic parameter data received by said receiving means a vowel parameter data which most exhibits predetermined vowel characteristics usable for vowel recognition, and vowel address detecting means for detecting an address of the vowel parameter data in said memory means;
   boundary detecting means for detecting at least one of starting and end points of a vowel segment to detect a boundary address corresponding to the boundary between the consonant and vowel in the speech signal, which includes address designating means for sequentially designating the address of the acoustic parameter data in said memory means, said address designating means initially storing address data designating an acoustic parameter data adjacent to the vowel parameter data designated by the vowel address detected by said vowel address detecting means, means for sequentially changing the address of said address designating means, thereby causing the acoustic parameter data to be sequentially read out from said memory means, similarity calculating means for sequentially calculating a similarity between each of the acoustic parameter data sequentially read out from said memory according to an address signal from said address designating means and the vowel parameter data obtained by said vowel parameter detecting means, and boundary address detecting means for detecting the boundary address by receiving the address from said address designating means which is generated when the similarity calculated by said similarity calculating means has reached a predetermined reference value of similarity;
   reading means for reading out a group of acoustic parameter data from said memory means starting from the boundary address derived from said boundary address detecting means; and
   phoneme recognition means for recognizing a phoneme based on the acoustic parameter data read out by said reading means.

2. A voice recognition apparatus according to claim 1, wherein said acoustic parameter data extracting means comprises a power spectrum data generating circuit for generating acoustic power spectrum data changing with time and in accordance with a voice signal from said voice signal generating means.

3. A voice recognition device according to claim 1 or 2, wherein said vowel detecting means comprises:
   a comparator for comparing acoustic parameter data read out from said memory means with a reference value and generating an output signal when it is detected that the acoustic parameter data value has reached the predetermined reference value, a correlator for receiving two acoustic parameter data read out from said memory means with a predetermined time interval therebetween and for calculating a correlation between both input data in response to an output signal from said comparator, and a comparator for comparing correlated data sequentially generated from said correlator.

4. A voice recognition device according to claim 3, wherein said phoneme recognition means has a phoneme recognizing section for recognizing a phoneme by detecting the similarity of acoustic parameter data from said vowel detecting means with acoustic parameter data from a dictionary parameter memory.

5. A voice recognition apparatus according to claim 3, wherein said phoneme recognition means comprises:
a data memory,
a read-write control circuit for transferring to said memory acoustic parameter pattern data including the acoustic parameter data from said boundary detecting means, and repeatedly reading out the acoustic parameter pattern data from said memory,
a dictionary memory storing a plurality of acoustic parameter pattern data each representing a reference phoneme,
a readout circuit for reading out the acoustic parameter pattern data from said dictionary memory,
a correlation circuit connected to receive the acoustic parameter pattern data from said data memory and dictionary memory to calculate the correlation between the received acoustic parameter pattern data, and
a maximum correlation detecting circuit connected to sequentially receive the correlation results from said correlation circuit to detect the maximum correlation.

6. A voice recognition apparatus according to claim 5, wherein the acoustic parameter data is acoustic power spectrum data and the acoustic parameter pattern data is acoustic power spectrum pattern data formed of a plurality of successive acoustic power spectrum data.

7. A voice recognition device according to claim 1 or 2, wherein said phoneme recognizing means comprises:
a phoneme recognizing section for recognizing a phoneme by matching acoustic parameter data from said vowel detecting means with acoustic parameter data from a dictionary parameter memory.

8. A voice recognition apparatus according to claim 7, wherein said phoneme recognition means comprises:
a data memory,
read-write control circuit for transferring to said memory acoustic parameter pattern data including the acoustic parameter data from said boundary detecting means, and repeatedly reading out the acoustic parameter pattern data from said memory,
a dictionary memory storing a plurality of acoustic parameter pattern data each representing a reference phoneme,
a readout circuit for reading out the acoustic parameter pattern data from said dictionary memory,
a correlation circuit connected to receive the acoustic parameter pattern data from said data memory and dictionary memory to calculate the correlation between the received acoustic parameter pattern data, and
a maximum correlation detecting circuit connected to sequentially receive the correlation results from said correlation circuit to detect the maximum correlation.

9. A voice recognition apparatus according to claim 8, wherein the acoustic parameter data is acoustic power spectrum data and the acoustic parameter pattern data is acoustic power spectrum pattern data formed of a plurality of successive acoustic power spectrum data.

10. A voice recognition apparatus according to claim 1 or 2, wherein said boundary detecting means comprises:
a correlator for calculating the similarity of acoustic parameter data detected by said vowel detecting means and acoustic parameter time-sequentially read out from said memory means, and
a comparator for comparing the result obtained in said correlator with a predetermined value and producing an output signal when it is detected that the result has reached the predetermined value.

11. A voice recognition apparatus according to claim 1 or 2, wherein the acoustic parameter data is an acoustic power spectrum data which is formed of a plurality of acoustic power data each defined by a timing at which the voice signal is generated and a magnitude of the voice signal at said timing and at a selectively preset frequency.

12. A voice recognition apparatus according to claim 11, wherein a plurality of acoustic power data are sequentially stored in and read out from said memory means, and said phoneme recognition means includes,
a data memory,
read-write control circuit for transferring to said data memory acoustic power spectrum pattern data including the acoustic power spectrum data from said boundary detecting means and a predetermined number of acoustic power spectrum data which are generated before or after the acoustic power spectrum data from said boundary detecting means and are separated in time-sequential base away from the acoustic power spectrum data from said vowel detecting means, and repeatedly reading out the acoustic power spectrum data from said data memory,
a dictionary memory storing a plurality of acoustic power spectrum pattern data each representing a reference phoneme,
a readout circuit for reading out the acoustic power spectrum pattern data from said dictionary memory,
a correlation circuit connected to receive the acoustic power spectrum pattern data read out from said data memory and dictionary memory to calculate the correlation between the received acoustic power spectrum pattern data, and
a maximum correlation detecting circuit connected to sequentially receive the correlation results from said correlation circuit to detect the maximum correlation.

13. A voice recognition apparatus according to claim 12, wherein said read-write control circuit is connected to said dictionary memory to read out from said dictionary memory a first accoustic power spectrum pattern data and at least one second acoustic power spectrum pattern data which is constructed to represent the same phoneme as the first power spectrum pattern data, and the similarity between said first and said at least one second acoustic power spectrum pattern data becomes smaller in those portions which are to be correlated with that portion of the acoustic power spectrum pattern data read out from said data memory which is farther apart from the acoustic power spectrum data generated from said boundary detecting means.

* * * * *